(12) United States Patent
Yonaiyama et al.

(10) Patent No.: US 10,675,900 B2
(45) Date of Patent: Jun. 9, 2020

(54) LAMINATED FILM

(71) Applicant: Toray Industries, Inc., Tokyo (JP)

(72) Inventors: Shogo Yonaiyama, Gifu (JP); Masato Horie, Gifu (JP); Tomoko Hayano, Gifu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 142 days.

(21) Appl. No.: 16/076,730

(22) PCT Filed: Feb. 22, 2017

(86) PCT No.: PCT/JP2017/006617
§ 371 (c)(1),
(2) Date: Aug. 9, 2018

(87) PCT Pub. No.: WO2017/150303
PCT Pub. Date: Sep. 8, 2017

(65) Prior Publication Data
US 2019/0084328 A1 Mar. 21, 2019

(30) Foreign Application Priority Data

Mar. 1, 2016 (JP) ................................. 2016-038607

(51) Int. Cl.
| B41J 31/00 | (2006.01) |
| B32B 27/36 | (2006.01) |
| B32B 7/02 | (2019.01) |
| B41M 5/41 | (2006.01) |
| B41M 5/42 | (2006.01) |
| C08J 7/04 | (2020.01) |
| B41M 5/382 | (2006.01) |
| B41M 5/44 | (2006.01) |

(52) U.S. Cl.
CPC ............... B41J 31/00 (2013.01); B32B 7/02 (2013.01); B32B 27/36 (2013.01); B41M 5/38214 (2013.01); B41M 5/41 (2013.01); B41M 5/42 (2013.01); C08J 7/0427 (2020.01); *B41M 5/423* (2013.01); *B41M 5/426* (2013.01); *B41M 5/44* (2013.01); *B41M 2205/02* (2013.01); *B41M 2205/30* (2013.01); *B41M 2205/36* (2013.01); *C08J 2367/02* (2013.01); *C08J 2433/12* (2013.01); *C08J 2467/02* (2013.01); *Y10T 428/2495* (2015.01); *Y10T 428/24942* (2015.01); *Y10T 428/31786* (2015.04)

(58) Field of Classification Search
CPC ..... Y10T 428/24942; Y10T 428/31786; Y10T 428/2495
See application file for complete search history.

(56) References Cited

U.S. PATENT DOCUMENTS

| 6,303,210 | B1 * | 10/2001 | Watanabe | ................ B41M 5/41 428/141 |
| 2007/0026223 | A1 * | 2/2007 | Osada | ..................... B32B 27/08 428/332 |
| 2019/0084328 | A1 * | 3/2019 | Yonaiyama | ............. C08J 7/0427 |

FOREIGN PATENT DOCUMENTS

| JP | 6127292 | A | 2/1986 |
| JP | 2000289349 | A | 10/2000 |
| JP | 2001180129 | A | 7/2001 |
| JP | 2005007787 | A | 1/2005 |
| JP | 2005350615 | A | 12/2005 |
| JP | 2010228426 | A | 10/2010 |

OTHER PUBLICATIONS

International Search Report and Written Opinion for International Application No. PCT/JP2017/006617, dated Apr. 25, 2017—7 pages.

* cited by examiner

Primary Examiner — Betelhem Shewareged
(74) Attorney, Agent, or Firm — RatnerPrestia

(57) ABSTRACT

A laminated film is provided which has excellent shape appearance at winding and also excellent processability and is capable of achieving higher glossiness of printed objects, the laminated film containing a substrate layer (layer A) composed of a biaxially oriented polyester film and a coating layer (layer B) on at least one side of the layer A, wherein the crystal size of the (100) plane of the layer A obtained by an X-ray diffraction measurement is 4.5 nm or more and less than 6.0 nm, a higher heat shrinkage ratio of the laminated film at 150° C. for 30 minutes between a heat shrinkage ratio in the longitudinal direction and a heat shrinkage ratio in the width direction at 150° C. for 30 minutes is 0.5 to 2.5%, the layer B is located on at least one outermost surface layer, and a surface opposite to the surface having the layer B has a center line average roughness (SRa) of 5 to 15 nm.

11 Claims, No Drawings

LAMINATED FILM

CROSS REFERENCE TO RELATED APPLICATIONS

This is the U.S. National Phase application of PCT/JP2017/006617, filed Feb. 22, 2017, which claims priority to Japanese Patent Application No. 2016-038607, filed Mar. 1, 2016, the disclosures of these applications being incorporated herein by reference in their entireties for all purposes.

TECHNICAL FIELD OF THE INVENTION

The present invention relates to a laminated film which is excellent in the shape appearance at winding and the processability and is capable of achieving higher glossiness of printed objects.

BACKGROUND OF THE INVENTION

Biaxially oriented polyester films in which polyethylene terephthalate, polyethylene-2,6-naphthalate or the like is used are excellent in mechanical properties, heat resistance, dimension stability, chemical resistance, cost efficiency, etc. Therefore, with the advantage of their performance, the biaxially oriented polyester films are employed in various applications. One example of the applications is a thermal transfer ribbon. The thermal transfer recording method has been already used in areas such as a facsimile, bar code printing, etc., because of its excellent cost efficiency, maintenance property, operability, and the like. The use of a sublimation dye in the thermal transfer ink instead of the existing melting pigment allows for properties such as high resolution, high image quality and the like. As a result, the thermal transfer recording method has been used frequently in the area of digital photo printing, etc., and has progressively replaced the conventional method using silver-halide method. In recent years, the quality demanded in the digital photo printing has been increasing. Even in the thermal transfer recording method, the glossiness as good as that of the inkjet recording method is required in printed objects. Therefore, a printing property greater than ever is demanded in a polyester film for a thermal transfer ribbon. In order to improve the printing property, a method to smoothen the surface of the polyester film by decreasing the content of particles contained in the polyester film or reducing the particle size has been discussed so far (Patent Document 1).

PATENT DOCUMENTS

PATENT DOCUMENT 1: JP2005-350615A

SUMMARY OF THE INVENTION

As shown in Patent Document 1, by a method to smoothen the surface of the polyester film by decreasing the content of particles contained in the polyester film or reducing the particle size, the printing property can be improved to a certain degree. However, in the case of a thin film such as a thermal transfer ribbon, there arose a problem of the shape appearance at winding of the film and, when formed into a thermal transfer ribbon, of the complicated processability such as the occurrence of wrinkles on the ribbon after printing and the image property of printed objects, and also a problem that sufficient glossiness of printed objects cannot be obtained. The present invention solves the above problem and provides a laminated film which is excellent in the shape appearance at winding and the processability and is capable of achieving higher glossiness of printed objects.

In order to solve the above problem, the present invention applies a following framing.

[I] A laminated film comprising a substrate layer (layer A) composed of a biaxially oriented polyester film and a coating layer (layer B) on at least one side of the layer A, wherein the crystal size of a (100) plane of the layer A obtained by an X-ray diffraction measurement is 4.5 nm or more and less than 6.0 nm, a higher heat shrinkage ratio of the laminated film between a heat shrinkage ratio in the longitudinal direction and a heat shrinkage ratio in the width direction at 150° C. for 30 minutes is 0.5 to 2.5%, the layer B is located on at least one outermost surface layer, and a surface opposite to the surface having the layer B has a center line average roughness (SRa) of 5 to 15 nm.

[II] The laminated film according to [I], wherein the surface of the layer B has a maximal protrusion height (SRmax) of 1.0 to 3.0 μm.

[III] The laminated film according to [I] or [II], wherein the substrate layer (layer A) composed of a biaxially oriented polyester film has a coating layer (layer B) only on one side, and one outermost surface layer is the layer A while the other outermost surface layer is the layer B.

[IV] The laminated film according to [III], wherein the coefficient of kinetic friction when, using two laminated films, the surface of the layer A and the surface of the layer B are laid on each other is 0.6 or less.

[V] The laminated film according to any one of [I] to [IV], wherein the number of protrusions SPc (protrusions/0.2 mm$^2$) on the surface opposite to the surface having the layer B is 150 or less.

[VI] The laminated film according to any one of [I] to [V], wherein the surface of the layer B has a center line average roughness (SRa) of 5 to 20 nm.

[VII] The laminated film according to any one of [I] to [VI], wherein the number of protrusions SPc (protrusions/0.2 mm$^2$) on the surface of the layer B is more than 150 and 500 or less.

[VIII] The laminated film according to any one of [I] to [VII], wherein both of the layer A and the layer B contain particles and satisfy the following Formulas (1) to (3), in which Ta (μm) is the thickness of the layer A, Tb (μm) is the thickness of the layer B, Da (μm) is the average particle size of the particles contained in the layer A, Db (μm) is the average particle size of the particles contained in the layer B:

$$1.0 \leq Ta/Da \leq 4.0 \quad \text{Formula (1)}$$

$$2\times10^{-3} \leq Tb/Da \leq 50\times10^{-3} \quad \text{Formula (2)}$$

$$0.02 \leq Db \leq 0.1 \quad \text{Formula (3)}.$$

[IX] The laminated film according to [VIII], wherein the Ta is 1.5 to 9.0 μm, the Tb is 0.01 to 0.1 μm, the Da is 1.5 to 5.0 μm, the content of the particles contained in the layer A is 0.01 to 0.06% by weight based on the layer A, and the content of the particles contained in the layer B is 10 to 30% by weight based on the layer B.

[X] The laminated film according to any one of [I] to [IX], used as a substrate of a sublimation thermal transfer ribbon, wherein a layer comprising wax as a principal component is provided on the surface of the layer B which is the outermost surface layer, and an ink layer is provided on an opposite side to the layer B.

[XI] A sublimation thermal transfer ribbon, wherein a layer comprising wax as a principal component is provided on the surface of the layer B which is the outermost surface layer of the laminated film recited in any one of [I] to [X], and an ink layer is provided on a side opposite to the layer B.

According to the present invention, a laminated film which is excellent in the shape appearance at winding and the processability and is capable of achieving higher glossiness of printed objects can be provided.

DETAILED DESCRIPTION OF CERTAIN EMBODIMENTS OF THE INVENTION

The laminated film of the present invention comprises a substrate layer (layer A) composed of a biaxially oriented polyester film and a coating layer (layer B) on at least one side of the layer A. In the laminated film of the present invention, the polyester used in the layer A is any polyester which can be a high strength film due to the molecular orientation associated with the stretching, and is preferably polyethylene terephthalate or polyethylene-2,6-naphthalate. It may be a polyester copolymer. In the repeat structural unit, 80% by mole or more is preferably ethylene terephthalate or ethylene-2,6-naphthalate. Examples of other polyester copolymer components include diol components such as diethylene glycol, propylene glycol, neopentyl glycol, polyethylene glycol, p-xylene glycol, 1,4-cyclohexane dimethanol and the like, dicarboxylic acid components such as adipic acid, sebacic acid, phthalic acid, isophthalic acid, 5-sodium sulfoisophthalic acid and 2,6-naphthalene dicarboxylic acid, polyfunctional dicarboxylic acid components such as trimellitic acid and pyromellitic acid, p-hydroxyethoxybenzoic acid, and the like. In addition, one or more kind(s) of an alkali metal salt derivative of sulfonic acid which is not reactive with the polyester, polyalkylene glycol and aliphatic polyester which are insoluble in the polyester, or the like can be copolymerized or blended with the above polyester as long as the amount does not exceed 5%.

In the laminated film of the present invention, the coating layer (layer B) is preferably a layer which is formed after a resin composition comprising a polyester resin and/or an acrylic resin as a principal constituent is coated. The principal constituent indicates a constituent that occupies 50% by weight or more based on the entire solid weight of the resin composition forming the coating layer (layer B). More preferably, the solid ratio of the total of the polyester resin and the acrylic resin to the entire solid weight of the resin composition forming the coating layer (layer B) is 70% by weight or more.

In the laminated film of the present invention, examples of the polyester resin used in the coating layer (layer B) include those subjected to polycondensation from a polybasic acid component and a polyol component as shown below. Examples of the polybasic acid component include terephthalic acid, isophthalic acid, phthalic anhydride, adipic acid, sebacic acid, trimellitic acid, pyromellitic acid and the like. Examples of the polyol component include, but are not limited to, ethylene glycol, 1,4-butanediol, diethylene glycol, 1,6-hexanediol, dimethylol propane, and the like. Two or more kinds of these monomer components can be used for copolymerization.

In the laminated film of the present invention, examples of the acrylic resin used for the coating layer (layer B) include those polymerized from an acrylic monomer as shown below. That is, examples of the monomer include, but are not limited to, alkyl acrylate or alkyl methacrylate having a linear, branched or cyclic alkyl group, a hydroxy-containing monomer, an epoxy group-containing monomer, a monomer containing a carboxy group or a salt thereof, a monomer containing an amide group, an acid anhydride monomer, vinyl chloride, acrylonitrile, vinylidene chloride, vinyl acetate, and the like. Two or more kinds of these monomer components can be used for copolymerization.

In the laminated film of the present invention, the substrate layer (layer A) composed of a biaxially oriented polyester film is, in the measurement method explained later, is required to have the crystal size of the (100) plane of 4.5 nm or more and less than 6.0 nm, which is obtained by the X-ray diffraction measurement. In the present invention, the crystal size of the (100) plane obtained by the X-ray diffraction measurement is a value calculated from a half width of the diffraction peak, employing the X-ray diffraction measurement. The polyester constituting the biaxially oriented polyester film has different thermal conductivities in the crystalline part undergoing the oriented crystallization and in the non-crystalline part. With the progress of the oriented crystallization, the crystalline part becomes dominant and the crystallization size becomes larger. The crystal size of the (100) plane within this range assures a uniform thermal conductivity and decreases an uneven distribution of the heat of the film, thereby allowing an ink or a paint to be coated evenly and resulting in higher glossiness of the printed object. However, when the crystal size of the (100) plane is less than 4.5 nm, the non-crystalline part becomes dominant, resulting in an inferior thermal dimension stability and a poor processability. On the other hand, the crystal size of the (100) plane of 6.0 nm or more decreases the stretching property and causes difficulty in film formation. More preferably, the crystal size of the (100) plane is 4.5 nm or more and less than 5.6 nm.

Moreover, in the laminated film of the present invention, between the heat shrinkage ratio in the longitudinal direction and the heat shrinkage ratio in the width direction at 150° C. for 30 minutes, a higher heat shrinkage ratio needs to be 0.5 to 2.5%. The heat shrinkage ratio within the above range suppresses the occurrence of wrinkles and leads to good processability even in the application which involves heating for the processing. When the laminated film of the present invention is used as a substrate of a thermal transfer ribbon, the heat shrinkage ratio within the above range can lower the difference in the heat shrinkage during the thermal transfer step between an ink ribbon and an ink acceptor, thereby preventing slur due to the thermal deformation between them and stabilizing the thermal transfer step. As a result, the uniform thermal transfer of the ink and higher glossiness of the printed object can be obtained. Conventionally, in the case of using the laminated film as a substrate of a thermal transfer ribbon, it was believed that a small heat shrinkage ratio was preferable. However, dedicated studies by the present inventors have discovered that when a higher heat shrinkage ratio between the heat shrinkage ratio in the longitudinal direction and the heat shrinkage ratio in the width direction at 150° C. for 30 minutes is less than 0.5%, a large difference in the heat shrinkage is caused between the ink ribbon and the ink acceptor, and revealed a problem that the ink cannot be thermally transferred in a uniform way. On the other hand, when the higher heat shrinkage is more than 2.5%, wrinkles are likely to occur during the processing, causing a problem of a decreased productivity and processability. The above problem is particularly pronounced in the case of a thin film. The higher heat shrinkage is more preferably 0.8 to 2.2%.

In the laminated film of the present invention, at least one outermost surface layer is the layer B, and the surface opposite to the surface having the layer B has a center line average roughness (SRa) of 5 to 15 nm. With the surface opposite to the surface having the layer B having a center line average roughness (SRa) within this range, when an ink layer is provided on the surface opposite to the layer B to form a sublimation thermal transfer ribbon, a highly smooth film can be obtained, allowing higher glossiness of the printed object. The center line average roughness (SRa) of less than 5 nm decreases the processability because wrinkles occur or a surface is damaged upon the winding during the film production or upon the transfer during the ink processing step. The center line average roughness (SRa) of more than 15 nm causes poor smoothness of the film, and sufficient glossiness of the printed object cannot be obtained. Furthermore, the ink causes repelling and the like, and the sharpness may deteriorate. The center line average roughness (SRa) is more preferably 9 to 12 nm.

In the laminated film of the present invention, the maximal protrusion height SRmax on the surface of the layer B is preferably 1.0 to 3.0 µm from the viewpoint of the shape appearance at winding. When the SRmax is less than 1.0 µm, the winding during the film production may become difficult. The SRmax of more than 3.0 µm may lead to coating omission on the printed object.

In the laminated film of the present invention, a substrate layer (layer A) composed of a biaxially oriented polyester film has a coating layer (layer B) only on one side, and it is preferred that one outermost surface layer is the layer A while the other outermost surface layer is the layer B. In this lamination structure, it is preferred from the viewpoint of the processability that the laminated film of the present invention has a coefficient of kinetic friction of 0.6 or less when, using two laminated films, the surface of the layer A and the surface of the layer B are laid on each other. In the present invention, the coefficient of kinetic friction is obtained according to ASTM D1824 by a measurement method which will be explained later in detail. When the coefficient of kinetic friction exceeds 0.6, wrinkles are likely to occur during the processing, resulting in lower processability, and the peeling electrification during the unwinding of the film roll is unfavorable. Thus, flaws are induced upon the processing, and at the same time, in a step in which an organic solvent is used, a risk that the organic solvent catches fire may accompany. The coefficient of kinetic friction is more preferably 0.55 or less. For the coefficient of kinetic friction, the lower limit is not determined, but considering the nature of the materials, the lower limit is 0.1 or more.

On the surface opposite to the surface having the layer B of the laminated film of the present invention, the number of protrusions SPc (protrusions/0.2 mm$^2$) is preferably 150 or less, and more preferably 120 or less. Within this range, when an ink layer is provided on the surface opposite to the layer B to form a sublimation thermal transfer ribbon and this ribbon is used to perform printing, the glossiness of the printed object can be improved. On the other hand, when the SPc exceeds 150, the glossiness of the printed object may decrease.

In the laminated film of the present invention, the surface of the layer B has preferably a center line average roughness (SRa) of 5 to 20 nm. When, the surface of the layer B has a center line average roughness (SRa) of 5 nm or less, the slidability deteriorates easily because the surface of the layer B is too smooth. As a result, wrinkles occur, or the edges do not match in the case of a film roll, causing a worse shape appearance at winding in some cases. Furthermore, wrinkles may also be caused on the film during the post processing which is the transfer upon the ink processing. When the center line average roughness (SRa) of the surface of the layer B exceeds 20 nm, the surface of the layer B is transferred to the opposite side to the layer B during the storage of the film roll after the film winding because the surface is rough. Consequently, during the ink processing, the omission of the ink coating or an uneven coating may occur, and the printing property of the printed object may deteriorate.

Furthermore, in the laminated film of the present invention, the number of protrusions SPc (protrusions/0.2 mm$^2$) on the surface of the layer B is preferably more than 150 and 500 or less. When the number is 150 protrusions/0.2 mm$^2$ or less, the slidability deteriorates. As a result, wrinkles occur or the edges do not match in the case of a film roll, causing a worse shape appearance at winding in some cases. The upper limit is not particularly limited, but over 500, the excessive number of protrusions generates a higher friction, and the traveling performance during the film production may worsen.

In the laminated film of the present invention, the layer B preferably contains particles. When the layer B contains particles, the effect such as the shape appearance at winding and the prevention of peeling electrification can be obtained by improving the sliding property without decreasing the image sharpness. The type of particles to be contained in the layer B is not particularly limited, but preferably particles having heat resistance capable of withstanding heat during the printing because, when the laminated film of the present invention is used for a thermal transfer ribbon, high heat is applied at the time of printing. Therefore, inorganic particles that can withstand heat during printing are preferable. When organic particles are used, the image quality of the printed object may be impaired because organic particles cannot withstand heat during printing. Examples of the inorganic particles used in the present invention include fine particles of minerals such as silica, alumina, calcium carbonate, magnesium oxide, titanium oxide, aluminum silicate, barium sulfate, of metals, of metal oxides, of metal salts and the like. The shape is preferably spherical, and spherical silica fine particles are particularly preferable. The production method thereof is not particularly limited, but the particles can be synthesized by an alkoxide method, for example.

In the laminated film of the present invention, the layer A preferably contains particles. When the layer A contains particles, it becomes easy to optimize the protrusion height on the surface of the film layer and the surface roughness. The type of particles to be contained in the layer A is not particularly limited, but inert particles are preferably used. Preferable examples of the inert particles include inorganic particles such as spherical silica, aluminum silicate, titanium dioxide and calcium carbonate. Preferable examples of other organic polymer particles include cross-linked polystyrene resin particles, cross-linked silicone resin particles, cross-linked acrylic resin particles, cross-linked styrene-acrylic resin particles, cross-linked polyester particles, polyimide particles, melamine resin particles and the like. One kind or two or more kinds of these can be selected for use.

These inert particles can be added at the stage of the polyester polymerization step to prepare an inert particle-containing polymer. For example, a slurry of ethylene glycol which is a glycol component of polyester is prepared. An inert particle-containing slurry is added after the transesterification before polycondensation or at the stage of oligomer after esterification, and subsequently subjected to polycondensation reaction. Thus, an inert particle-containing polymer can be obtained. Both the layer A and the layer B preferably contain particles. In the laminated film of the present invention, both of the layer A and the layer B preferably satisfy the following Formulas (1) to (3), wherein Ta (μm) is the thickness of the layer A, Tb (μm) is the thickness of the layer B, Da (μm) is the average particle size of the particles contained in the layer A, Db (μm) is the average particle size of the particles contained in the layer B. A film satisfying the Formulas (1) to (3) exhibits an improved processability and shape appearance at winding. Any one of the Formulas (1) to (3) is not satisfied, the shape appearance at winding and the productivity may deteriorate. When printing is performed with the thermal transfer ribbon produced using the film, the printed object may show a degraded sharpness.

$1.0 \leq Ta/Da \leq 4.0$      Formula (1)

$2 \times 10^{-3} \leq Tb/Da \leq 50 \times 10^{-3}$      Formula (2)

$0.02 \leq Db \leq 0.1$      Formula (3).

In Formula (1), when the Ta/Da is less than 1.0, the particle size is larger than the layer A, causing a fragile film. Consequently, the productivity deteriorates in some cases. On the other hand, when the Ta/Da exceeds 4.0, the formation of the unevenness on the film is reduced, resulting in the deterioration of the shape appearance at winding in some cases.

In Formula (2), when the Tb/Da is less than $2 \times 10^{-3}$, the film surface rises, a corrugation of the film tends to occur during the coating of the layer B, and the processability may decrease. On the other hand, when the Tb/Da is more than $50 \times 10^{-3}$, the layer B has less surface unevenness, and the shape appearance at winding may deteriorate. The Tb/Da is more preferably in a range of $5 \times 10^{-3}$ or more and $30 \times 10^{-3}$ or less.

In Formula (3), the Db of less than 0.02 is likely to cause a worse sliding property while the Db of more than 0.1 may tend to cause a coating defect when the layer B is coated.

In the laminated film of the present invention, it is preferred that the Ta is 1.5 to 9.0 μm, the Tb is 0.01 to 0.1 μm, the Da is 1.5 to 5.0 μm, the content of the particles contained in the layer A is 0.01 to 0.06% by weight based on the layer A, and the content of the particles contained in the layer B is preferably 10 to 30% by weight based on the layer B. When the content of the particles contained in the layer B is less than 10% by weight with regard to the layer B, the sliding property is likely to worsen. When the content is more than 30% by weight, the particles tend to fall at the carrier line, causing a process contamination in some cases. When the thickness of the layer B (Tb) is less than 0.01 μm, the fall of the particles contained in the layer B during the processing step leads to a defect, causing the decrease of the image sharpness in some cases. On the other hand, when the thickness of the layer B (Tb) is more than 0.1 μm, it is more difficult for the surface unevenness of the layer B to form, and the improvement of the sliding property may not be recognized.

The particles contained in the layer A preferably have an average particle size (Da) of 1.5 to 5.0 μm, and more preferably 2.0 to 4.0 μm. Several particles of different average particle sizes may be added. When the particles to be added have the average particle size of less than 1.5 μm, the sufficient shape appearance at winding cannot be obtained. When the average particle size is more than 5.0 μm, the productivity may decrease because the film may break during the stretching step. The content of the particles is preferably in a range of 0.01 to 0.06% by weight based on the layer A. With the content of less than 0.01% by weight, the shape appearance at winding is likely to worsen, and with the content of more than 0.06% by weight, the sufficient glossiness of printed objects may not be obtained.

The thickness of the laminated film of the present invention is, considering its use as a thermal transfer ribbon, preferably 1.0 to 10.0 μm. When the thickness of the laminated film is less than 1.0 μm, the thermal property or the mechanical property as a film for a thermal transfer ribbon may deteriorate. The thickness of the laminated film of more than 10.0 μm causes a lower efficiency because a higher energy is necessary for the thermal head in the case of utilization as an ink ribbon. In addition, the life of the head shortens, and in some cases, the printing takes more time. The thickness of the laminated film is preferably 1.5 to 9.0 μm.

The biaxially oriented polyester film used in the laminated film of the present invention can be, for example, obtained by the following method. First of all, a polyester raw material (preferably a polyester raw material containing particles) is melted and formed into a film shape using a slit die. Afterwards, the resulting film is wound around a casting drum with the surface temperature of 20 to 70° C. to be cooled and solidified. Thus, an unstretched film is obtained. The unstretched film is then stretched at 80 to 130° C. in the longitudinal direction by 3.0 to 7.0 times to obtain a monoaxially stretched film. By stretching the film at multiple stages, a film which is oriented heavily in the longitudinal direction can be obtained without impairing the film-forming property.

The monoaxially stretched film is introduced into a tenter and preheated at 90 to 130° C., in which the drying of the coating of the coating layer is also combined. Then, the film is stretched in the width direction by 3.0 to 4.5 times to form a biaxially stretched film and the biaxially stretched film is heat set at 200 to 230° C. The heat set temperature is preferably 200° C. to 235° C. When the temperature is lower than 200° C., heat crystallization does not proceed sufficiently and the resulting film has low crystallizability. When the temperature is higher than 235° C., the heat crystallization proceeds excessively, and the orientation of the molecular chains proceeded by stretching decreases. It is also possible to stretch the film further in the longitudinal or transverse direction or in both longitudinal and transverse directions before the heat set to increase the strength. After the heat set, the film is shrunk by 0 to 8% in the width direction at 140 to 185° C. and wound in a roll shape. The final film forming rate in the longitudinal direction is preferably 100 to 400 m/min, more preferably 150 to 350 m/min, and further preferably 160 to 320 m/min. The biaxially oriented polyester film in the laminated film of the present invention is not limited to the one obtained by the production method described herein.

The coating layer (layer B) can be provided either during or after the production step of the biaxially oriented polyester film. In the latter case, it is industrially inefficient, it is difficult to coat uniformly, and dust is likely to be collected and causes a defect during the printing. Therefore it is preferable to adopt the former method. The coating during the production step may be carried out at any stage as long as it is before the oriented crystallization is completed. The coating may be provided on any film, such as a film in an unstretched state, a film after monoaxial stretching, and a film which is before the final re-stretching after the stretching at a small degree. As a coating method of the coating layer, it is preferable to use a roll coater, a gravure coater, a reverse coater, a kiss coater, a bar coater, a curtain coater, a rod coater or the like, but the coating method is not particularly limited thereto.

In the case of producing a thermal transfer ribbon using the laminated film of the present invention, from the viewpoint of preventing fusion with the thermal head at the time of printing, preventing the blocking with the thermal transfer ink, and improving traveling performance, it is preferable to provide on the surface of the layer B a heat resistant sliding layer comprising a wax system as a principal component. Various commercially available waxes such as petroleum waxes, plant waxes, animal waxes, low molecular weight polyolefins, and the like can be used. Although not limited, the use of petroleum waxes and plant waxes are preferable from the viewpoint of the slidability.

Examples of the petroleum wax include paraffin wax, microcrystalline wax, petrolactam, oxidized wax and the like. The paraffin wax is particularly preferable. Examples of the animal wax include beeswax, lanolin, whale wax, insect wax, shellac wax, coccuscacti wax, water bird wax, and the like.

Examples of the plant wax include candelilla wax, carnauba wax, rice wax, palm wax, Japanese wax, jojoba wax, ouricury wax, sugar cane wax, esparto wax, bark wax, rosin modified wax, and the like. In particular, rosin modified wax is preferable in the present invention.

The molecular weight of the wax to be used is preferably 10000 or less, and more preferably 1000 or less from the viewpoint of dispersibility in water.

The wax is not particularly limited as long as it is any of the above-mentioned waxes, but it is preferable to use petroleum wax and plant wax in a mixed system from the viewpoint of slidability and releasability. Particularly preferably, paraffin wax and rosin modified wax are preferably used in a mixed system.

Various additives can be used in combination with the wax as long as the effect of the present invention is not impaired. For example, an antistatic agent, a heat resistant agent, an antioxidant, an organic or inorganic particle, a pigment and the like can be used.

Like the formation of the coating layer (layer B), the heat resistant sliding layer can be provided either during or after the production of the biaxially-stretched polyester film. A similar coating method as in in the case of forming the coating layer (layer B) can be used.

In the laminated film of the present invention, a ribbon is formed by providing a layer comprising wax as a principal component (heat resistant sliding layer) on the surface the coating layer (layer B) and providing an ink layer on the opposite side to the side provided with the coating layer (layer B) and the layer comprising wax as a principal component (heat resistant sliding layer). Such a ribbon is capable of achieving higher glossiness of printed objects and excellent in the shape appearance at winding and the processability, and therefore, can be used suitably as a sublimation thermal transfer ribbon. The thermal transfer ribbon can be produced by, when the ink layer is formed, coating a thermal transfer ink (a melting pigment or a sublimation dye). Commercially available common dyes can be used. In general, the dyes are coated in a state in which they are dissolved in a solvent such as methyl ethyl ketone, acetone, toluene or the like.

The use of the laminated film of the present invention produced as explained above as a sublimation thermal transfer ribbon allows for higher glossiness of printed objects. In addition, excellent shape appearance at winding and processability can be achieved as well.

EXAMPLES

Methods of measurements used in Examples herein are described.

(1) Crystal Size of (100) Plane

A PW1729 X-ray diffraction instrument manufactured by PHILIPS was used for the measurement. The measurement conditions are as follows. Samples are cut out in a size of 2 cm×2 cm, stacked to the thickness as close as possible to 100 μm, and then set in a way that the film side is parallel to the diffraction side. The diffraction peak was obtained at a normal temperature/atmospheric pressure, by CuKα radiation of 35 kV and 15 mA within the θ range of 18° to 30°. The half width h (°) of the resulting diffraction peak of the (100) plane was used to calculate the crystal size according to the following formula.

$$\chi c = 43.05/h$$

(2) Heat Shrinkage Ratio

The distance between reference lines of 200 mm is taken on a film sample (the direction connected reference lines is considered as a length direction), and the film is cut to 10 mm. The film sample was hung in the length direction, and a 1-gram load was added in the longitudinal direction. After the sample is heated by a hot air of 150° C. for 30 minutes, the distance between reference lines was measured and the amount of contraction of the film was expressed in percentage as a ratio to the original dimension. The evaluation was carried out five times for the distance when the longitudinal direction was used as the length direction and when the width direction was used as the length direction. The average value for each was obtained as the heat shrinkage ratio in the longitudinal direction at 150° C. for 30 minutes and the heat shrinkage ratio in the width direction at 150° C. for 30 minutes.

(3) Maximal Protrusion Height (SRmax), Peak Count (SPc), and Center Line Average Roughness (SRa)

A three-dimensional roughness measuring instrument with an optical probe (critical-angle focus error detection method) (ET-30HK) manufactured by Kosaka Laboratory Ltd. was used for the measurement.

The SRmax and SRa values in the present invention are values measured by a three-dimensional roughness measuring instrument, equivalent to Rmax and Ra values from JIS-B0601(1994). For the SPc, a peak count level was set in parallel to and at a distance of 3 nm from the central line of the roughness curve. Between two points where the curve crosses the average line and peak count level, when one or more point(s) crossing the upper peak count was observed, this is considered as one peak. The number of peaks were measured 10 times within the length to be measured, and the average value was obtained. The measurement direction was in the width direction, the cut-off value was 0.25 mm, the measured length was 0.5 mm, feed length was 5 μm, the probe weight was 10 mg, the measurement rate was 100 μm/s, and the measured lines were 80 per one field of view.

(4) Coefficient of Kinetic Friction

A sample was subjected to humidity adjustment and aging for 24 hours under the conditions of 23° C. and 65% RH. According to ASTM D-1894, the coefficient of kinetic friction of the side provided with the coating layer (layer B) and the opposite side was measured under the following conditions, using a slip tester.

Sample size: 75 mm (width)×100 mm (length)
Sliding rate: 150 mm/min
Load: 200 g (5) Thickness of Substrate Layer (Layer A) and Thickness of Coating Layer (Layer B)

A film piece of 1 mm (width)×10 mm (length) was embedded in an epoxy resin in a way that the cross section of 5 mm in the width direction would be the top side. The epoxy resin part of the embedded piece was trimmed so that it could be set in a sample holder of a microtome. The cross section of the film piece embedded in the epoxy resin was cut in LKB Ultrotome 4801, using a diamond knife. After the surface was made smooth, the block embedded in the epoxy resin was dyed for the coating layer (layer B) under a $RuO_4$ atmosphere for 24 hours. After the dying treatment, the block embedded in the epoxy resin was again set in the microtome and cut using a diamond knife to prepare an extremely thin piece containing the dyed cross section. The extremely thin piece was observed by a transmission electron microscope H-7100 FA, manufactured by Hitachi, Ltd., to take a photo of the film cross section at the accelerating voltage of 75 kV and a magnification of 40000×. Thus, the thickness of the substrate layer (layer A) and the thickness of the dyed coating layer (layer B) were measured.

(6) Average Particle Size of Particles Contained in Substrate Layer (Layer A) and Coating Layer (Layer B)

An electric microtome ST-201 manufactured by Nihon Microtome Laboratory, Inc. was used to prepare a slice piece of the film with the cross section cut. The slice piece was fixed on a sample stage of a transmission electron microscope and subjected to ion etching for 10 minutes under the conditions of the vacuum of $10^{-3}$ Torr, the voltage of 0.25 KV, and the current of 12.5 mA, using a sputtering instrument. The surface was subjected to gold sputtering with the same instrument, and the cross section in the thickness direction was imaged with a scanning electron microscope at a magnification of 50000×. The n particles ($\geq$10) contained in the substrate layer (layer A) and the coating layer (layer B) were measured individually for the equivalent circle diameter, and the average value for each was used as the average particle size of particles contained the substrate layer (layer A) and the coating layer (layer B).

(7) Content of Particles Contained in Substrate Layer (Layer A) and Coating Layer (Layer B)

The substrate layer (layer A) and the coating layer (layer B) were separated by methyl ethyl ketone. For each of the substrate layer (layer A) and the coating layer (layer B), a solvent which dissolves resins that form the substrate layer and the coating layer but does not dissolve the particles is selected. The particles are separated by centrifugation from the resins forming the substrate layer and the coating layer. The ratio of the particles to the total weight (% by weight) is used as the content of the particles of the substrate layer (layer A) and the coating layer (layer B).

(8) Glossiness of Printed Objects

An aqueous heat resistant sliding layer was prepared by mixing acrylic acid ester/amino-modified silicone/isocyanate at a ratio=70/29/1 (weight ratio) and provided on the coating surface of the film (surface of the layer B). After that, a sublimation ink comprising a sublimation dye/ethyl hydroxy ethyl cellulose/methyl ethyl ketone/toluene at a ratio=5/5/45/45 (weight ratio) was coated on the opposite surface on which the aqueous heat resistant sliding layer was provided to prepare a sublimation thermal transfer ribbon. As a sublimation dye, the following dyes were used: yellow: Balanyl Yellow 5RX manufactured by BASF Co., Ltd., Magenta: Imirocan RED-FBL manufactured by Sumitomo Chemical Co., Ltd., Cyan: Kayaset Blue 714 manufactured by Nippon Kayaku Co., Ltd. Using this sublimation thermal transfer ribbon, a natural image with a width of 20 mm and a length of 100 mm was printed on a receiving paper, using a digital photo printer DS40 manufactured by Dai Nippon Printing Co., Ltd. The black background portion of the printed object was measured for a specular glossiness at an incident angle of 20° according to the method prescribed in JIS-Z8741 (1997), using a digital variable angle gloss meter UGV-5D manufactured by Suga Test Instruments Co., Ltd, and evaluated according to the following criteria.

S: The specular glossiness is 70% or more (superior)
A: The specular glossiness is 65% or more and less than 70% (good)
B: The specular glossiness is 50% or more and less than 65% (inferior commodity value)
C: The specular glossiness is less than 50% (Poor)

(9) Evaluation of Shape Appearance at Winding

A mill roll wound in the film production step was unwound to be slit in a small-width slitting machine to a width of 1 m and a length of 1000 m or more, and then evaluated according to the following criteria.

S: There is no wrinkle at the beginning of and during the winding, and there is no mismatch of the edges of the wound roll.
A: There is no wrinkle at the beginning of and during the winding, but a slight mismatch of the edges of the wound roll is observed partially.
B: A wrinkle(s) is/are observed at the beginning of the winding but disappear immediately.
C: The wrinkle(s) which has/have occurred at the beginning of the winding will not disappear, or wrinkle(s) occur(s) during the winding.

(10) Processability Evaluation

After the printing was performed according to the above (8), the ribbon after the printing and the printed image were observed and were evaluated according to the following criteria.

S: No wrinkle is observed on the printed image and the ribbon after the printing.
A: A wrinkle(s) is/are observed on the ribbon after the printing, but the printed image is good.
B: A wrinkle(s) is/are observed on the ribbon after the printing, and a wrinkle(s) of less than 1 cm is/are observed on the printed image.
C: A wrinkle(s) is/are observed on the ribbon after the printing, and a wrinkle(s) of 1 cm or more is/are observed on the printed images.

(11) Productivity

The number of film breaks during the film formation was counted, and evaluated as "A" when 0 to 1 break within 100 hours, as "B" when 2 to 3 breaks within 100 hours, and as "C" when 4 breaks or more within 100 hours.

In the above evaluations, when the longitudinal direction (MD) and the width direction (TD) of the film are not identified, a direction having the maximal refractive index on the film is considered as the longitudinal direction, and a direction perpendicular to the longitudinal direction is considered as the width direction. For the direction of the maximal refractive index on the film, the film can be measured for the refractive index in all the directions using an Abbe refractometer. For example, the direction of the maximal refractive index can be obtained by determining the axial direction of the delayed phase using a phase difference measuring instrument (birefringence instrument) or the like.

Example 1

Polyethylene terephthalate manufactured by Toray Industries, Inc., having an intrinsic viscosity of 0.61 and containing 0.03% by weight of silicon dioxide particles (manufactured by FUJI SILYSIA CHEMICAL LTD.,) with a number average particle size of 2.6 µm, was melted in an extruder at 285° C., melted and extruded into a sheet form from a slit die, attached to a rotating cooling drum of 25° C. and thus solidified, thereby forming an unstretched film. Using the difference of peripheral rates of heated rolls, the film was stretched in the longitudinal direction at 125° C. by 2.4 times (first stage stretching), and then in the longitudinal direction at 115° C. by 2.7 times (second stage stretching). The film was coated with a coating liquid on its one side by the gravure method while traveling. An aqueous polyester resin obtained by polycondensation of terephthalic acid/isophthalic acid/5-sodium sulfoisophthalic acid/ethylene glycol/1,4-butanediol at a ratio=30/15/5/30/20 (mol %), aqueous acrylic resin obtained by copolymerization of methyl methacrylate/ethyl acrylate/acrylic acid/N-methylol acrylamide at a ratio=75/22/1/2 (weight ratio), and colloidal silica having an average particle size of 45 nm were mixed at a ratio of the polyester resin/the acrylic resin/colloidal silica=50/30/20 (weight ratio). Then, water was used as a solvent so that the solid content weight would be 2% by weight.

Subsequently, both edges of this film were gripped with a clip, guided to a tenter, stretched at 110° C. in the width direction by 4.0 times, further thermally treated at 220° C., relaxed at 150° C. in the width direction by 4.0%, and then wound at a rate of 280 m/min to obtain a laminated film having a thickness of 4.5 µM. Properties of the resulting laminated film are shown in Tables.

In addition, a heat resistant sliding layer comprising wax as a principal component was provided on the surface of the coating layer (layer B) of the resulting laminated film, and a sublimation ink was coated on the opposite side to the coating layer to obtain a sublimation thermal transfer ribbon. The printing property was evaluated afterwards.

Example 2

A laminated film was obtained in the same way as in Example 1 except that the average particle size of the colloidal silica of the coating liquid for coating was changed to 80 nm, and then a sublimation thermal transfer ribbon was prepared. The evaluation was carried out the same way as in Example 1.

Example 3

A laminated film was obtained in the same way as in Example 1 except that the thermal treatment temperature was changed to 205° C., and then a sublimation thermal transfer ribbon was prepared. The evaluation was carried out in the same way as in Example 1.

Example 4

A laminated film was obtained in the same way as in Example 1 except that the thermal treatment temperature was changed to 230° C., and then a sublimation thermal transfer ribbon was prepared. The evaluation was carried out in the same way as in Example 1.

Example 5

A laminated film was obtained in the same way as in Example 1 except that the film was relaxed at 150° C. in the width direction by 8.0%, and then a sublimation thermal transfer ribbon was prepared. The evaluation was carried out in the same way as in Example 1.

Example 6

A laminated film was obtained in the same way as in Example 1 except that the film was relaxed at 150° C. in the width direction by 3.0%, and then a sublimation thermal transfer ribbon was prepared. The evaluation was carried out in the same way as in Example 1.

Example 7

A laminated film was obtained in the same way as in Example 1 except that the content of silicon dioxide particles was changed to 0.015% by weight, and then a sublimation thermal transfer ribbon was prepared. The evaluation was carried out in the same way in Example 1.

Example 8

A laminated film was obtained in the same way as in Example 1 except that the content of silicon dioxide particles was changed to 0.06% by weight, and then a sublimation thermal transfer ribbon was prepared. The evaluation was carried out in the same way in Example 1.

Example 9

A laminated film was obtained in the same way as in Example 1 except that the content of silicon dioxide particles of a number average particle size of 1.5 µm was changed to 0.06% by weight, and then a sublimation thermal transfer ribbon was prepared. The evaluation was carried out in the same way in Example 1.

Example 10

A laminated film was obtained in the same way as in Example 1 except that the content of silicon dioxide particles of a number average particle size of 4.5 µm was changed to 0.01% by weight, and then a sublimation thermal transfer ribbon was prepared. The evaluation was carried in the same way in Example 1.

Example 11

A laminated film was obtained in the same way as in Example 1 except that the content of silicon dioxide particles of a number average particle size of 0.1 µm was changed to 0.3% by weight, and then a sublimation thermal transfer ribbon was prepared. The evaluation was carried out in the same way in Example 1.

Example 12

A laminated film was obtained in the same way as in Example 1 except that the content of silicon dioxide particles of a number average particle size of 5.0 µm was changed to 0.03% by weight, and then a sublimation thermal transfer ribbon was prepared. The evaluation was carried out in the same way in Example 1.

Example 13

A laminated film was obtained in the same way as in Example 1 except that a coating liquid which was obtained by mixing the polyester resin/acrylic resin/colloidal silica at a ratio=65/30/5 (weight ratio) was used, and then a sublimation thermal transfer ribbon was prepared. The evaluation was carried out in the same way in Example 1.

Examples 14, 15

A laminated film was obtained in the same way as in Example 13 except that the content of the particles was changed as shown in Table 2. A sublimation thermal transfer ribbon was then prepared and the evaluation was carried out in the same way in Example 1.

Example 16

A laminated film was obtained in the same way as in Example 1 except that the particles to be added to the film were changed to silicon dioxide particles of a number average particle size of 2.2 μm, that the particles to be added to the coating material had a number average particle size of 0.1 μm, and that the coating was performed so that the final thickness of the coating material would be 0.120 μm. A sublimation thermal transfer ribbon was then prepared and the evaluation was carried out in the same way in Example 1.

Example 17

A laminated film was obtained in the same way as in Example 16 except that the content of the particles to be added to the coating material was changed as shown in Table 2. A sublimation thermal transfer ribbon was then prepared and the evaluation was carried out in the same way in Example 16.

Example 18

A laminated film was obtained in the same way as in Example 1 except that the particles to be added to the coating material had the number average particle size of 0.1 μm, and that the coating was performed so that the final thickness of the coating material would be 0.180 μm. A sublimation thermal transfer ribbon was then prepared and the evaluation was carried out in the same way in Example 1.

Comparative Example 1

A laminated film was obtained in the same way as in Example 1 except that the thermal treatment temperature was changed to 195° C., and then a sublimation thermal transfer ribbon was prepared. The evaluation was carried out in the same way in Example 1.

Comparative Example 2

A laminated film was obtained in the same way as in Example 1 except that the thermal treatment temperature was changed to 240° C., and then a sublimation thermal transfer ribbon was prepared. The evaluation was carried out in the same way in Example 1.

Comparative Example 3

A laminated film was obtained in the same way as in Example 1 except that the film was relaxed at 150° C. in the width direction by 12.0%, and then a sublimation thermal transfer ribbon was prepared. The evaluation was carried out in the same way in Example 1.

Comparative Example 4

A laminated film was obtained in the same way as in Example 1 except that the film was relaxed at 150° C. in the width direction by 1.5%, and then a sublimation thermal transfer ribbon was prepared. The evaluation was carried out in the same way in Example 1.

Comparative Example 5

A laminated film was obtained in the same way as in Example 1 except that the content of silicon dioxide particles was changed to 0.008% by weight, and then a sublimation thermal transfer ribbon was prepared. The evaluation was carried out in the same way in Example 1.

Comparative Example 6

A laminated film was obtained in the same way as in Example 1 except that the content of silicon dioxide particles was changed to 0.09% by weight, and then a sublimation thermal transfer ribbon was prepared. The evaluation was carried out in the same way in Example 1.

Comparative Example 7

A laminated film was obtained in the same way as in Example 1 except that the particles to be added to the film were changed to silicon dioxide particles of a number average particle size of 2.2 μm, that the content of the particles was 0.05% by weight, that the particles to be added to the coating material had a number average particle size of 0.1 μm, and that the coating was performed so that the final thickness of the coating material would be 0.180 μm. A sublimation thermal transfer ribbon was then prepared and the evaluation was carried out in the same way in Example 1.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Crystal size (nm) | | 5.5 | 5.6 | 4.6 | 5.9 | 5.5 | 5.5 | 5.6 | 5.4 | 5.4 |
| Higher heat shrinkage ratio between heat shrinkage ratio in longitudinal direction and heat shrinkage ratio in width direction at 150° C. for 30 min (%) | | 2.1 | 2.1 | 2.0 | 2.0 | 0.6 | 2.5 | 2.1 | 2.0 | 2.1 |
| Layer A | SRa (nm) | 11 | 11 | 10 | 11 | 11 | 10 | 5 | 15 | 10 |
| | SPc (protrusions/0.2 mm$^2$) | 100 | 95 | 95 | 100 | 105 | 95 | 70 | 120 | 150 |
| | Thickness Ta (μm) | 4.5 | 4.5 | 4.5 | 4.5 | 4.5 | 4.5 | 4.5 | 4.5 | 4.5 |
| | Average particle size Da (μm) | 2.6 | 2.6 | 2.6 | 2.6 | 2.6 | 2.6 | 2.6 | 2.6 | 1.5 |
| | Particle content (wt %) | 0.03 | 0.03 | 0.03 | 0.03 | 0.03 | 0.03 | 0.015 | 0.06 | 0.06 |
| Layer B | SRa (nm) | 10.0 | 10.5 | 9.0 | 10.0 | 10.0 | 9.0 | 4.0 | 14.0 | 9.0 |
| | SPc (protrusions/0.2 mm$^2$) | 300 | 195 | 295 | 300 | 205 | 295 | 270 | 320 | 350 |
| | SRmax (μm) | 2.0 | 2.0 | 2.1 | 2.0 | 1.8 | 2.0 | 2.2 | 2.0 | 1.1 |
| | Thickness Tb (μm) | 0.023 | 0.025 | 0.024 | 0.024 | 0.025 | 0.025 | 0.025 | 0.024 | 0.024 |
| | Average particle size Db (μm) | 0.045 | 0.08 | 0.045 | 0.045 | 0.045 | 0.045 | 0.045 | 0.045 | 0.045 |
| | Particle content (wt %) | 20 | 20 | 20 | 20 | 20 | 20 | 20 | 20 | 20 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Coefficient of kinetic friction between surface of layer A and surface of layer B | 0.53 | 0.51 | 0.51 | 0.51 | 0.51 | 0.51 | 0.55 | 0.50 | 0.50 |
| Ta (μm)/Da (μm) | 1.7 | 1.7 | 1.7 | 1.7 | 1.7 | 1.7 | 1.7 | 1.7 | 3.0 |
| Tb (μm)/Da (μm) | 8.8E−03 | 9.6E−03 | 9.2E−03 | 9.2E−03 | 9.6E−03 | 9.6E−03 | 9.6E−03 | 9.2E−03 | 1.6E−02 |
| Glossiness of printed object | S | S | S | A | A | A | S | A | S |
| Shape appearance at winding | S | S | S | S | S | A | A | S | A |
| Processability | S | S | A | S | S | A | A | S | S |
| Productivity | A | A | A | B | A | B | A | A | A |

TABLE 2

|  |  | Example 10 | Example 11 | Example 12 | Example 13 | Example 14 | Example 15 | Example 16 | Example 11 | Example 18 |
|---|---|---|---|---|---|---|---|---|---|---|
| Crystal size (nm) |  | 5.5 | 5.7 | 5.5 | 5.5 | 5.5 | 5.5 | 5.5 | 5.5 | 5.5 |
| Higher heat shrinkage ratio between heat shrinkage ratio in longitudinal direction and heat shrinkage ratio in width direction at 150° C. for 30 min (%) |  | 2.0 | 2.2 | 2.0 | 2.2 | 2.1 | 2.1 | 2.2 | 2.2 | 2.2 |
| Layer A | SRa (nm) | 11 | 11 | 13 | 11 | 11 | 11 | 11 | 11 | 11 |
|  | SPc (protrusions/0.2 mm²) | 60 | 230 | 95 | 100 | 100 | 100 | 100 | 100 | 100 |
|  | Thickness Ta (μm) | 4.5 | 4.5 | 4.5 | 4.5 | 4.5 | 4.5 | 4.5 | 4.5 | 4.5 |
|  | Average particle size Da (μm) | 4.5 | 0.1 | 5.0 | 2.6 | 2.6 | 2.6 | 2.2 | 2.2 | 2.6 |
|  | Particle content (wt %) | 0.01 | 0.3 | 0.03 | 0.03 | 0.03 | 0.03 | 0.03 | 0.03 | 0.03 |
| Layer B | SRa (nm) | 10.0 | 10.0 | 12.0 | 10.8 | 10.2 | 9.8 | 14.0 | 17.0 | 13.0 |
|  | SPc (protrusions/0.2 mm²) | 260 | 430 | 295 | 150 | 250 | 350 | 140 | 180 | 120 |
|  | SRmax (μm) | 2.8 | 0.4 | 3.6 | 2.0 | 2.0 | 2.0 | 1.7 | 1.7 | 1.7 |
|  | Thickness Tb (μm) | 0.024 | 0.024 | 0.023 | 0.023 | 0.023 | 0.023 | 0.120 | 0.120 | 0.180 |
|  | Average particle size Db (μm) | 0.045 | 0.045 | 0.045 | 0.045 | 0.045 | 0.045 | 0.1 | 0.1 | 0.1 |
|  | Particle content (wt %) | 20 | 20 | 20 | 5 | 15 | 25 | 5 | 10 | 5 |
| Coefficient of kinetic friction between surface of layer A and surface of layer B |  | 0.51 | 0.51 | 0.50 | 0.64 | 0.58 | 0.45 | 0.68 | 0.66 | 0.70 |
| Ta (μm)/Da (μm) |  | 1.0 | 45.0 | 0.9 | 1.7 | 1.7 | 1.7 | 2.0 | 2.0 | 1.7 |
| Tb (μm)/Da (μm) |  | 5.3E−03 | 2.4E−01 | 4.6E−03 | 8.8E−03 | 8.8E−03 | 8.8E−03 | 5.5E−02 | 5.5E−02 | 6.9E−02 |
| Glossiness of printed object |  | A | A | A | S | S | S | S | B | S |
| Shape appearance at winding |  | S | B | S | S | S | S | B | B | B |
| Processability |  | A | S | B | B | A | S | B | B | B |
| Productivity |  | B | A | B | A | A | A | A | A | A |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Crystal size (nm) |  | 4.1 | 6.5 | 5.4 | 5.8 | 5.5 | 5.6 | 6 |
| Higher heat shrinkage ratio between heat shrinkage ratio in longitudinal direction and heat shrinkage ratio in width direction at 150° C. for 30 min (%) |  | 2.1 | 1.9 | 0.3 | 2.8 | 2.0 | 2.1 | 1.5 |
| Layer A | SRa (nm) | 10 | 11 | 11 | 10 | 3 | 23 | 16 |
|  | SPc (protrusions/0.2 mm²) | 95 | 105 | 100 | 100 | 60 | 170 | 160 |
|  | Thickness Ta (μm) | 4.5 | 4.5 | 4.5 | 4.5 | 4.5 | 4.5 | 4.5 |
|  | Average particle size Da (μm) | 2.6 | 2.6 | 2.6 | 2.6 | 2.6 | 2.6 | 2.2 |
|  | Particle content (wt %) | 0.03 | 0.03 | 0.03 | 0.03 | 0.008 | 0.09 | 0.05 |
| Layer B | SRa (nm) | 9.0 | 10.0 | 10.0 | 10.0 | 2.5 | 22.0 | 18.0 |
|  | SPc (protrusions/0.2 mm²) | 295 | 305 | 300 | 300 | 260 | 370 | 180 |
|  | SRmax (μm) | 1.8 | 2.2 | 2.0 | 2.0 | 2.1 | 1.9 | 1.7 |
|  | Thickness Tb (μm) | 0.024 | 0.024 | 0.024 | 0.024 | 0.024 | 0.024 | 0.18 |
|  | Average particle size Db (μm) | 0.045 | 0.045 | 0.045 | 0.045 | 0.045 | 0.045 | 0.1 |
|  | Particle content (wt %) | 20 | 20 | 20 | 20 | 20 | 20 | 5 |
| Coefficient of kinetic friction between surface of layer A and surface of layer B |  | 0.50 | 0.51 | 0.50 | 0.50 | 0.55 | 0.49 | 0.55 |
| Ta (μm)/Da (μm) |  | 1.7 | 1.7 | 1.7 | 1.7 | 1.7 | 1.7 | 2.0 |
| Tb (μm)/Da (μm) |  | 9.2E−03 | 9.2E−03 | 9.2E−03 | 9.2E−03 | 9.2E−03 | 9.2E−03 | 8.2E−02 |
| Glossiness of printed object |  | A | B | B | B | S | C | C |
| Shape appearance at winding |  | S | S | S | A | C | S | B |
| Processability |  | C | A | C | C | C | S | A |
| Productivity |  | A | C | A | A | A | A | B |

In Tables, in the section of Tb (μm)/Da (μm), the exponential notation is described as E. For example, 8.8E−0.3 means $8.8 \times 10^{-3}$.

The laminated film of the present invention is excellent in the shape appearance at winding and the processability. Therefore, printed objects of high glossiness can be provided by using the laminated film of the present invention as a substrate of thermal transfer ribbon, especially of a sublimation thermal transfer ribbon.

The invention claimed is:

1. A laminated film comprising a substrate layer (layer A) comprised of a biaxially oriented polyester film and a coating layer (layer B) on at least one side of the layer A, wherein a (100) plane of the layer A obtained by an X-ray diffraction measurement has a crystal size 4.5 nm or more and less than 6.0 nm, a higher heat shrinkage ratio of the laminated film between a heat shrinkage ratio in the longitudinal direction and a heat shrinkage ratio in the width direction at 150° C. for 30 minutes is 0.5 to 2.5%, the layer B is located on at least one outermost surface layer, and a surface opposite to the surface having the layer B has a center line average roughness (SRa) of 5 to 15 nm.

2. The laminated film according to claim 1, wherein the surface of the layer B has a maximal protrusion height (SRmax) of 1.0 to 3.0 μm.

3. The laminated film according to claim 1, wherein the substrate layer (layer A) comprised of a biaxially oriented polyester film has a coating layer (layer B) only on one side, and one outermost surface layer is the layer A while the other outermost surface layer is the layer B.

4. The laminated film according to claim 3, wherein the coefficient of kinetic friction when, using two laminated films, the surface of the layer A and the surface of the layer B are laid on each other is 0.6 or less.

5. The laminated film according to claim 1, wherein the number of protrusions SPc (protrusions/0.2 mm$^2$) on the surface opposite to the surface having the layer B is 150 or less.

6. The laminated film according to claim 1, wherein the surface of the layer B has a center line average roughness (SRa) of 5 to 20 nm.

7. The laminated film according to claim 1, wherein the number of protrusions SPc (protrusions/0.2 mm$^2$) on the surface of the layer B is more than 150 and 500 or less.

8. The laminated film according to claim 1, wherein both of the layer A and the layer B contain particles and satisfy the following Formulas (1) to (3), in which Ta (μm) is the thickness of the layer A, Tb (μm) is the thickness of the layer B, Da (μm) is the average particle size of particles contained in the layer A, and Db (μm) is the average particle size of particles contained in the layer B:

$$1.0 \leq Ta/Da \leq 4.0 \quad \text{Formula (1)}$$

$$2 \times 10^{-3} \leq Tb/Da \leq 50 \times 10^{-3} \quad \text{Formula (2)}$$

$$0.02 \leq Db \leq 0.1 \quad \text{Formula (3)}.$$

9. The laminated film according to claim 8, wherein the Ta is 1.5 to 9.0 μm, the Tb is 0.01 to 0.1 μm, the Da is 1.5 to 5.0 μm, the content of the particles contained in the layer A is 0.01 to 0.06% by weight based on the layer A, and the content of the particles contained in the layer B is 10 to 30% by weight based on the layer B.

10. The laminated film according to claim 1, used as a substrate of a sublimation thermal transfer ribbon, wherein a layer comprising wax as a principal component is provided on the surface of the layer B which is the outermost surface layer, and an ink layer is provided on an opposite side to the layer B.

11. A sublimation thermal transfer ribbon, comprising a layer comprising wax as a principal component provided on the surface of the layer B which is the outermost surface layer of the laminated film recited in claim 1, and an ink layer provided on an opposite side to the layer B.

* * * * *